United States Patent Office 3,153,066
Patented Oct. 13, 1964

3,153,066
PROCESS FOR DICARBONYL COMPOUNDS
Frank X. Werber, Rockville, Md., assignor to W. R.
Grace & Co., a corporation of Connecticut
No Drawing. Filed Sept. 19, 1961, Ser. No. 139,058
8 Claims. (Cl. 260—586)

This invention relates to the catalytic oxidation of organic compounds. In one specific aspect, it relates to the selenium-catalyzed oxidation of carbonyl compounds and more particularly, to the conversion of monocarbonyl compounds to dicarbonyl compounds by means of ozone.

The methylene group adjacent to the carbonyl group in an aldehyde or ketone has been oxidized to the carbonyl group by passing the compound and oxygen over a metal oxide catalyst at elevated temperatures. See, for example, Hearne et al., U.S. Patent 2,393,532, and Peters, U.S. Patent 2,686,813. Such processes must be run in the presence of a diluent or at low rates of conversion per pass. Otherwise, condensative polymerization reactions of the reactive carbonyl group rapidly deactivate the catalyst by coating it with organic material which becomes carbonized at the elevated temperatures used. Another well known method of converting carbonyl compounds to dicarbonyl compounds is by the action of selenium dioxide on the monocarbonyl compound. See, for example, Riley, U.S. Patent 1,955,890.

This application is a continuation in part of application having Serial No. 814,663, now abandoned.

This reaction is effected at moderate temperatures and essentially in the liquid phase (selenium dioxide is used as a finely divided solid).

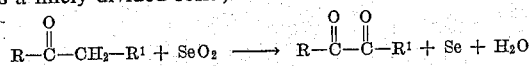

It is apparent from the equation which represents the reaction that stoichiometric quantities of selenium dioxide are required. It is true that the selenium may be recovered and reused by its conversion to the dioxide and subsequent purification but this must be accomplished independently and requires a series of manipulations. See Riley, cited supra. It is also known that ozone reacts slowly with ketones to cleave the carbon chain with the resultant formations of two carboxylic acids, Stoll and Scherrer, Helv. Chem. Acta., 13, 142 (1942).

In addition, Richter (see U.S. Patent 2,648,638) teaches that selenium used as a catalyst in less than stoichiometric amounts in the presence of air to oxidize propylene at a temperature below 250° C. forms only a trace amount of acrolein. The selenium catalyst is rapidly deactivated and hydrogen selenide is formed in large amounts. Under such circumstances the reaction is impractical since recovery and reactivation of the selenium is complicated, time consuming and costly. Thus, as Richter points out, selenium does not lend itself to a cyclic or catalytic operation at temperatures below about 450° C.

Surprisingly, it has now been discovered that the methylene group adjacent to the carbonyl group in a ketone or aldehyde can be oxidized by a continuous low temperature process which comprises subjecting said aldehyde or ketone to the action of ozone in the presence of a selenium or selenium dioxide catalyst in less than stoichiometric amounts to form the dicarbonyl compound.

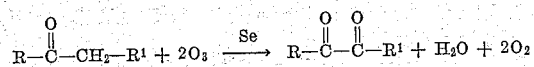

The process is not cyclic in the sense that the selenium catalyst must be removed from the system and reactivated prior to reuse. The process is continuous as long as ozone is fed to the reaction zone containing the selenium catalyst and the reactant aldehyde or ketone. The ozone functions as an oxidizing agent to oxidize the selenium so that the reaction is truly catalytic, i.e., the selenium catalyst can be recovered intact at the cessation of the continuous process.

It has also been found that oxygen or air when substituted for ozone as an oxidizing agent is not operable in performing this invention in the absence of a promoter for the oxidizing agent such as oxides of nitrogen.

It is, therefore, an object of the present invention to provide a continuous low temperature method in the liquid phase for the preparation of alpha dicarbonyl compounds from suitable aldehydes and ketones using ozone as the oxidizing agent in the presence of a selenium or selenium dioxide catalyst.

Carbonyl compounds suitable for use in this process include diethyl ketone, ethyl propyl ketone, methyl benzyl ketone, cyclopentanone, methylcyclohexanone, methyl isobutyl ketone, their homologues and condensed ring system containing the same. For example,

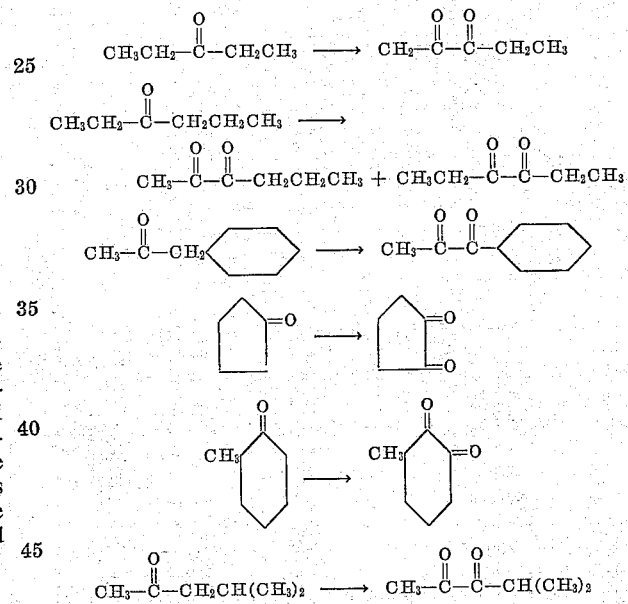

The above reactions are only meant to be illustrative of the various types of carbonyl compounds that may be used in the instant invention and this list is not intended to delimit the invention. It is apparent, of course, that in order to be operative in the process, the reactant aldehyde or ketone must possess an adjacent methylene group. Thus aldehydes of the type —CH₂—CHO and ketones of the type

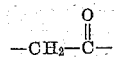

are suitable provided the remainder of the molecule is substantially stable to the action of ozone under the oxidative reaction conditions employed. (Similar considerations apply to the solvent used.)

In a generalized procedure, ozonated oxygen is passed continuously, over a period of time, through a stirred solution or suspension of the reactant aldehyde or ketone in an appropriate unreactive solvent. Preferably, the liquid reactants are contained in a long thin tube in order to increase their contact time with the gaseous reactants and thus promote efficient ozone consumption. Finely divided selenium or selenium dioxide is present in catalytic amounts, usually about 1 to 5% by weight of the reactant carbonyl compound.

One advantage of using a selenium catalyst in the instant invention is that the process is performed at low temperatures in the liquid phase. While some oxidation occurs even below room temperature, moderate heating is used to speed up the reaction rate and increase the conversion of monocarbonyl to dicarbonyl compound per unit time. The process, however, is operative at a temperature from about −5° C to 90° C. Above 90° C. further oxidation and other undesirable side reactions start to consume the product dicarbonyl compound thereby adversely affecting the overall yield and the apparent rate of product formation.

The preferred solvent employed in performing the instant invention is water. However, other operable solvents which will remain liquid under the operating conditions herein and will not interfere with the reaction will readily come to mind of one skilled in the art.

The flow of ozone is continued until the desired degree of conversion is obtained. It is not necessary to carry the reaction to completion and there is no lower limit to the amount of ozone that may be used or its rate of passage through the reaction mixture. Practical considerations require that the ozone be passed through at the maximum rate consistent with efficient usage. On the other hand, after the conversion has been completed, the continued presentation of ozone can only lower the yield of isolatable product. The selection of optimum flow rates under a given set of experimental conditions will present no problem to one skilled in the art.

The resultant alpha dicarbonyl product is isolated from the reaction mixture by conventional techniques. Separation by fractional distillation is the most convenient approach for lower boiling components. Another standard procedure utilizes solvent extraction of the reaction mixture, washing of the organic extract with base to remove acidic by-products and recovery of the product from the extract by evaporation of the solvent or partial evaporation of the solvent when the product will crystallize from a more concentrated solution on cooling. Another approach particularly useful for the isolation and characterization of product dicarbonyl compounds is the formation of insoluble and highly crystalline derivatives of the carbonyl function. After isolation, recrystallization and characterizations, these derivatives may be hydrolyzed to yield pure parent dicarbonyl compound. Other methods of isolation including these dependent on the peculiar properties of specific compounds will be obvious to the practicing organic chemist.

It has been found that superior results are obtained using this process when the ozonation is carried out at 40 to 60° C. The scope and utility of the invention is further illustrated by the following examples.

*Example I*

Methyl ethyl ketone (108 g.), selenium dioxide (26 g.) and water (30 g.) were placed in a vertical glass column provided with a stirrer and with a fritted glass disc at the bottom. The column was heated to about 55° C. and oxygen containing 2.59 g. of ozone per cubic foot was bubbled through the reaction mixture via the fritted disc until a total of 16.6 g. or 0.35 mole of ozone had been consumed. The organic portion of the reaction product was titrated with aqueous sodium hydroxide to determine any acid formed due to the direct reaction of ozone with the ketone. Only 0.087 mole of carboxylic acid was formed; thus about 0.26 mole of ozone was consumed in oxidizing methyl ethyl ketone to the yellow diketone, biacetyl as shown.

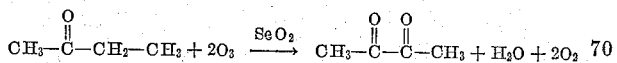

*Example II*

A vertical glass column, similar to that of Example I and provided with a stirrer and gas inlet, was charged with 0.5 mole of cyclohexanone, 0.02 mole of selenium dioxide and about 0.6 mole of water. Ozonated oxygen was passed through the reaction mixture kept at 40 to 50° C. over a period of five hours. Of the 0.336 mole of ozone passed into the reaction mixture, 0.31 mole was absorbed and reacted. After heating overnight at 50° C., the reaction mixture was filtered in order to free it from solid materials (mainly selenium). The filtrate was divided into portions for characterization, analysis and preparation of derivatives. Treatment of an aliquot with nickel chloride and hydroxylamine hydrochloride followed by isolation of the cyclohexane-1,2-dione nickel glyoxime thus precipitated showed that the conversion of cyclohexanone to cyclohexane-1,2-dione was about 20% complete. Another portion gave the characteristic oxime of cyclohexane-1,2-dione (observed melting point 182–183° C. uncorrected) on treatment with hydroxylamine hydrochloride alone. Titration of a portion of the filtrate with aqueous sodium hydroxide showed it to contain acidic materials and adipic acid (observed melting point 148–151° C. uncorrected showing no depression when mixed with an authentic sample of adipic acid) was isolated from the last portion of the original filtrate. The main reaction was the oxidation of cyclohexanone to cyclohexane-1,2-dione as shown.

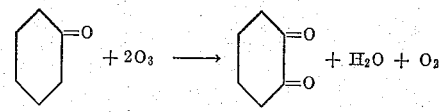

In a side reaction, cyclohexanone was oxidized to adipic acid as illustrated.

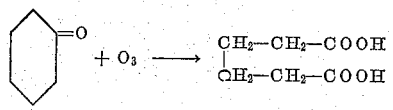

*Example III*

Using essentially the procedure of Example II, 98 g. of cyclohexanone, 5 g. of selenium dioxide and 20 ml. of water held at about 45° C. were treated over a period of five hours with 29 g. of ozone. About 19.6 g. of the cyclohexanone was converted to cyclohexane-1,2-dione, the yield of which was 22.4 g.

To summarize, the action of ozone on methylene groups adjacent to carbonyl groups oxidizes such methylene groups to the carbonyl group with the resultant formations of alpha dicarbonyl compounds. The oxidation must be carried out in the liquid phase and at low temperatures in the presence of a selenium catalyst. The independent concurrent oxidation of the carbonyl group by ozone (uncatalyzed) gives rise to by-product carboxylic acids.

I claim:

1. A continuous liquid phase process for the oxidation of a compound of the formula

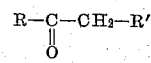

in which R is a member of the group consisting of hydrogen and an alkyl and R′ is a member of the group consisting of phenyl and alkyl, and R and R′ taken together represent a alkylene group which comprises passing ozone through a reaction zone containing said compound at a temperature between −5° C. and 90° C. in the presence of a catalyst selected from the group consisting of selenium and selenium dioxide, thereby forming the corresponding dicarbonyl compound

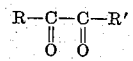

in stoichiometric excess over the said catalyst, and recovering said dicarbonyl compound.

2. The process according to claim 1 wherein the catalyst is selenium dioxide.

3. The process according to claim 1 wherein the catalyst is selenium.

4. The process according to claim 1 wherein the compound is methyl ethyl ketone.

5. The process according to claim 1 wherein the compound is cyclohexanone.

6. A continuous liquid phase process for the oxidation of a compound of the formula

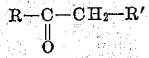

in which R is a member of the group consisting of hydrogen and an alkyl and R' is a member of the group consisting of phenyl and an alkyl, and R and R' taken together represent an alkylene group which comprises passing ozone through said compound held at a temperature between —5° C. and 90° C. in the presence of an unreactive solvent and a catalyst selected from the group consisting of selenium and selenium dioxide thereby forming the corresponding dicarbonyl compound

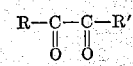

in stoichiometric excess over the said catalyst and recovering said dicarbonyl compound.

7. A continuous liquid phase process for the oxidation of methyl ethyl ketone which comprises passing ozone through said ketone held at 40 to 60° C. in the presence of an unreactive solvent and a catalyst consisting essentially of selenium dioxide thereby forming diacetyl in stoichiometric excess over the said catalyst and recovering said diacetyl.

8. A continuous liquid phase process for the oxidation of cyclohexanone which comprises passing ozone through cyclohexanone held at 40 to 50° C. in the presence of an unreactive solvent and a catalyst consisting essentially of selenium dioxide thereby forming cyclohexane-1,2-dione in stoichiometric excess over the said catalyst and recovering said cyclohexane-1,2-dione.

References Cited in the file of this patent
UNITED STATES PATENTS

| | | |
|---|---|---|
| 1,955,890 | Riley | Apr. 24, 1934 |
| 2,648,638 | Richter | Aug. 11, 1953 |